Oct. 4, 1966     W. M. SZWAJKOWSKI     3,276,134
GAUGE FOR INDICATING PITCH OF BOWLING BALL BORES AND THE LIKE
Filed June 1, 1964
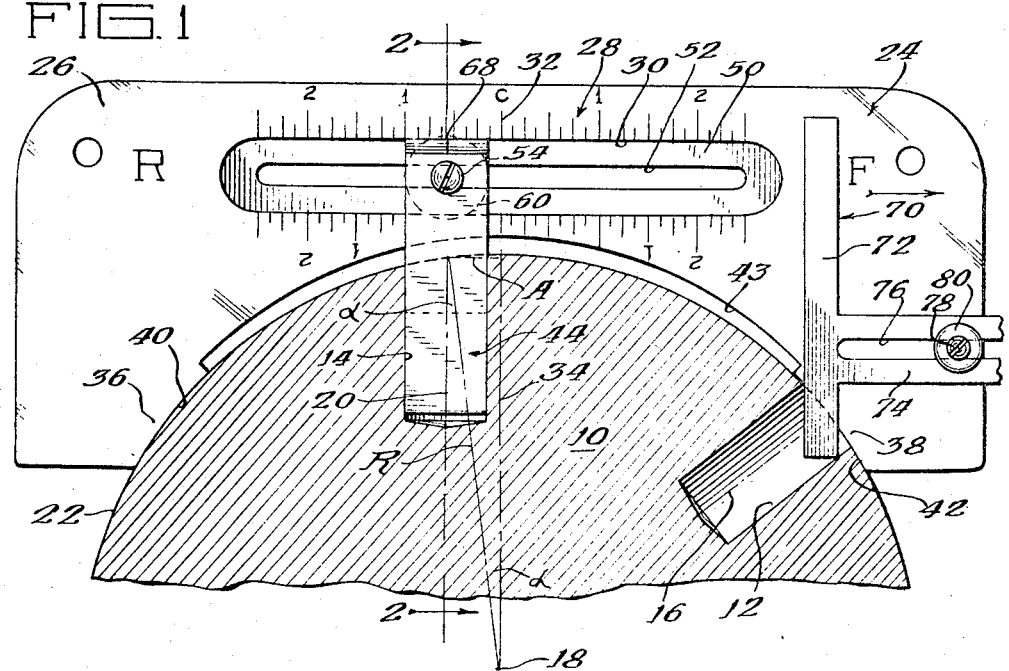
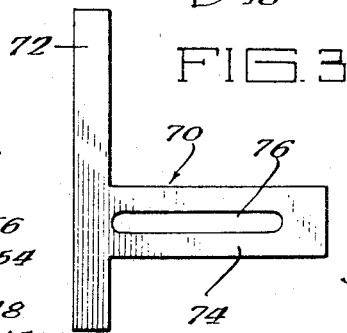
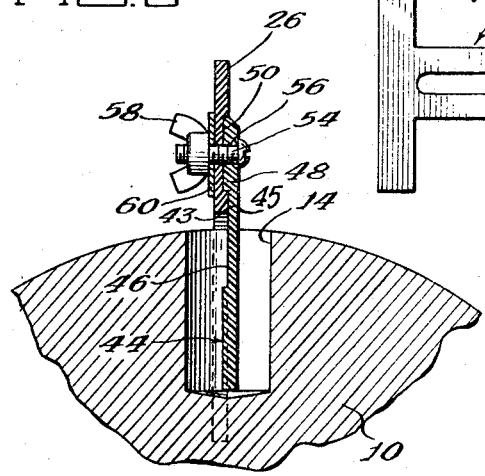
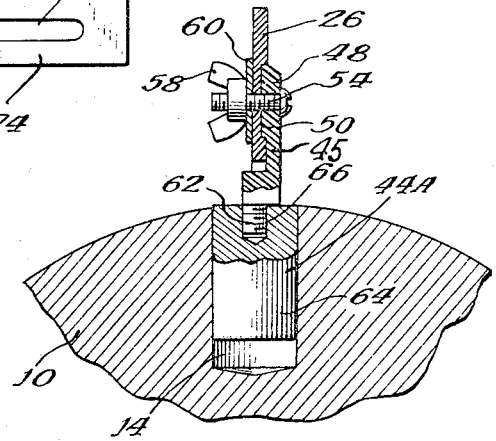
Inventor:
Walter M. Szwajkowski
By:
Attorneys

2

United States Patent Office 3,276,134
Patented Oct. 4, 1966

3,276,134
GAUGE FOR INDICATING PITCH OF BOWLING
BALL BORES AND THE LIKE
Walter M. Szwajkowski, 6000 S. Normandie Ave.,
Chicago, Ill.
Filed June 1, 1964, Ser. No. 371,534
7 Claims. (Cl. 33—174)

The present invention relates generally to devices for measuring the angle of a hole in a circular surface relative to the radius of said surface at that hole, and more particularly to gauges for measuring the pitch of finger bores in bowling balls.

It has long been known that the behavior of a bowling ball is effected by the angle of the hole in the ball. A bowling ball can be made to either travel in a straight line, curve gently, or hook, depending upon the angle of the hole in the ball relative to the radius of the ball at the hole. Experienced bowlers are accustomed to try different balls with different angled finger holes in order to perfect the type of ball they desire to throw. In order for experiments of this type to be meaningful, it is necessary to know the pitch of the finger holes in the ball. Also, it is often desirable and necessary to check the pitch of finger holes in existing balls. It is a general object of the present invention to provide a gauge which is suitable for checking the pitch of finger holes in bowling balls which is simple and provides more accurate measurements than the gauges previously known and used.

Gauges for checking the pitch of finger holes for bowling balls which employ templates which support pivotally mounted pointers are shown in Patent No. 2,706,338 to Ackerman et al. and Patent No. 2,714,256 to Watson. Such devices require the pivot point of the pointer to be on the axis of the hole for accuracy, and small deviations in the pivot point produce substantial errors. Further, the scale for indicating the pitch of the hole is inherently short with such devices.

It is an object of the present invention to provide a device for measuring the pitch of a hole in a circular member which is more accurate than the template type devices employing pivotally mounted pointers. In particular, it is an object of the present invention to provide a gauge for measuring both forward and reverse pitch for finger holes in bowling balls which is more accurate than the pivotal pointer type devices presently known and which provides a more readily readable and expanded measurement scale.

These and further objects of the present invention will become readily apparent to those skilled in the art from a further consideration of this specification, particularly when viewed in the light of the drawings, in which:

FIGURE 1 is a front elevational view of a gauge constructed according to the present invention shown in position on a bowling ball, the bowling ball being illustrated in central section, the view also carrying a diagram illustrating the manner of operation of the gauge;

FIGURE 2 is a sectional view taken along the line 2—2 of FIGURE 1;

FIGURE 3 is an enlarged view of the span measuring guide illustrated in FIGURE 1; and FIGURE 4 is a fragmentary sectional view in the same plane as FIGURE 2 of a modified construction of the present invention.

In FIGURE 1, a bowling ball 10 is fragmentarily illustrated and shown to have finger holes 12 and 14. Hole 12 has central axis 16. The finger hole 14 has a central axis 20 forming the angle $\alpha$ with the radius designated R which intersects the hole 14 at the surface 22 of the ball 10 and passes through the center 18 of the ball. It is the angle $\alpha$ which the gauge must measure.

A gauge is also illustrated in FIGURE 1 mounted on the ball 10 and designated 24. The gauge comprises a flat plate 26 which is provided with a scale 28 which extends along a straight axis 30. A zero angle marker 32, designated C, is located centrally of the scale 28. The axis 30 of the scale 28 is positioned perpendicular to the axis 20 of the bore 14. Thereafter, the scale 28 is translated relative to the ball 10 to position the zero angle marker 32 in alignment with that radius of the ball 10 disposed parallel to the axis 20 of the bore 14, this radius being designated 34. The distance between the zero angle marker 32 and the intersection of the axis 20 of the bore 14 on the scale 28 is a measurement of the angle $\alpha$ and may be calibrated in degrees or in inches, the latter being more customary for bowling ball pitch designations.

In FIGURE 1, the radius of the ball 10 parallel to the axis 20 of the bore 14 has been designated 34. The angle between the radius 34 and the radius R is equal to the angle $\alpha$ to be measured, and has been so designated. Since the radius R of the ball 10 is known, and the distance, designated A, between the axis 20 of the bore 14 and the radius 34 of the ball 10 is measured by the scale 28, it is possible to determine the angle $\alpha$. The ratio of the dimension designated A to the radius R is the sine of angle $\alpha$, and the angle may therefore be directly determined.

The zero angle marker 32 is in all cases located on a radius of the ball 10 by means of two feet 36 and 38 which are located at equal distances from the axis of the zero angle marker and on opposite sides thereof. The feet 36 and 38 have surfaces 40 and 42 which are disposed in abutment with the surface 22 of the ball 10, and these surfaces are curved on the same radius as the ball 10. As illustrated, a curved recess or indentation 43 extends between the feet 36 and 38, however, it is to be understood that the recess 43 may be of any configuration. It is also to be understood that the feet 36 and 38 may be located at different distances from the axis of the zero angle marker 32, even engaging the ball 10 on opposite surfaces thereof.

The axis 20 of the bore 14 is sensed by a rectangular flat peg 44 which extends therein. The peg 44 has a cross-section in the plane of FIGURE 1 equal to the diameter of the bore 14, and the peg 44 engages the walls of the bore 14. The peg 44 has a stem portion 45 exterior of the bore and a transverse channel 46 in the stem portion, thus forming a rectangular rib 48 at the end of the stem portion 45 remote from the bore 14. The rib 48 extends transversely across the end of the stem portion 45, and is disposed in an elongated recess 50 which extends into the one surface of the plate 26 parallel to the linear axis 30 of the scale 28, one of the parallel edges of the recess 50 being coincident with the linear axis 30 of the scale 28. The rib 48 is translatably disposed within the elongated recess 50, and maintains the peg 44 perpendicular to the recess 50. An elongated linear slot 52 is disposed centrally of the recess 50, and a bolt 54 extends through the slot 52. The bolt 54 also extends through a aperture 56 located centrally of the rib 48 of the peg 44, and the bolt terminates in a wing nut 58 on the opposite side of the plate 26 from the rib 48. A washer 60 is disposed between the wing nut and the plate 26. When the wing nut 58 is tightened on the washer 60, the peg 44 is secured in position in the recess 50.

FIGURE 4 illustrates a modified form of peg, designated 44A. This peg 44A also has a rib 48 identical to that previously disclosed, but the rib accommodates a threaded pin 62 which depends therefrom on the axis of the peg 44A. A cylindrical stub 64 is provided with an axial channel 66 which is threaded and engages the threaded pin 62. The stub 64 is selected to have the same diameter as the bore 14, and therefore may be changed to accommodate bores of different size to accurately locate the axis of the bore. Other elements of the peg 44A are identical to those of the peg 44 and bear the same reference numerals.

In order to properly utilize the gauge 24, one end of the gauge indicated by an arrow is positioned in alignment with the hole 12, that is, the finger hole which is not to be measured. The peg 44 or 44A is thereafter inserted into the bore 14 which is to be measured, the wing nut 58 is loosened and the peg is translated in the recess 50 and slots 52 to position the feet 36 and 38 in abutment with the exterior surface 22 of the ball.

It is to be noted that the peg 44 carries a line indicator 68 at its center which indicates a marking on the scale 28. The marking on the scale 28 relative to the zero angle marker 32 thereof indicates the pitch of the angle 14 directly. This scale 28 may either be in terms of inches of forward and reverse pitch, or angle displacement. The letter F is used to indicate forward and the letter R is used to indicate reverse pitch on the gauge scale of FIGURE 1. If the scale 28 is in terms of inches, as illustrated in FIGURE 1, the scale directly indicates the distance from the point of tangency of the ball and a plane parallel to the scale 30 that a drill must be moved to produce the forward or reverse pitch indicated on the scale.

FIGURES 1 and 3 also illustrate a slotted T 70 which is utilized to mark the span between the finger hole 12 and the finger hole 14. The T has a first linear rail 72 which extends into the hole 12 and abuts the surface 22 of the ball at the edge of the hole 12. The T 70 also has a second rail 74 which is provided with an axial slot 76. A locking screw 78 extends through the slot 76 and threadedly engages the plate 26. A washer 80 is disposed between the screw 78 and the slotted rail 74.

Once the slotted T 70 has been anchored in position, as indicated in FIGURE 1, the distance between the edges of the holes 12 and 14 may be measured with a tape measure, or the like, to determine the span.

It is to be noted that the rail 72 must be disposed parallel to the radius 34 of the ball 10 which passes through the zero angle marker 32 so that the gauge 24 may be removed from the bowling ball without displacing the slotted T 70. The edge of the rail 72 which abuts the surface of the bore 12 closest to that or bore 14 may then be used to measure the distance between the straight edge 68 on the peg 44 and the leading edge of the rail 72 in a direction parallel to the axis 30 of the scale 28 to obtain a measurement of the span of the ball.

From the foregoing disclosure, those skilled in the art will readily devise many modifications, applications, and improvements upon the gauge here described. For example, it should be apparent that the gauge here disclosed may be utilized with cylindrical surfaces as well as spheres, and that a gauge of a single construction will determine the pitch of bores in cylindrical surfaces of different diameters, since it is only necessary to locate the zero angle marker 32 on a radius of the cylindrical member. Further, the bores whose pitch is to be determined need not be cylindrical if the peg utilized with the bore is capable of locating the axis of the bore. Hence, it is intended that the scope of the present invention be not limited by the foregoing description, but rather only by the appended claims.

The invention claimed is:

1. A device for measuring the angle of a hole extending into an object with a circular cross-section measured in the plane of the cross-section relative to the radius of the object at the hole comprising a solid member having a linear scale thereon provided with a zero angle marker, means for sensing the central axis of the hole having a first portion adapted to be disposed within the hole and to engage the surface of the hole to assume a fixed and unique position within the hole, said means having an extending member mechanically connected to the first portion thereof, said extending member remaining exterior of the hole and having an axis disposed parallel to the axis of the hole when the first portion of the sensing means assumes its axis sensing position within the hole, said extending member being slidably mounted on the solid member with the axis thereof disposed normal to the axis of the linear scale of the solid member, and means for positioning the solid member to align the zero angle marker of the scale thereof with the radius of the object normal to the axis of the linear scale, whereby the distance between the zero marker of the scale and the intersection of the scale and the axis of the extending member of the sensing means is a measurement of the angle between the axis of the hole and the radius of the object at the center of the hole.

2. A device for measuring the angle of the axis of a linear bore extending into a circular body from the surface thereof relative to the radius of the object at the axis of the bore comprising a plate having flat surface with a linear scale thereon, said scale having a zero angle marker thereon, said plate having a recess in the flat surface thereof with sides parallel to the scale, means adapted to be disposed in the bore to be measured, said means being adapted to engage the surface of the bore to assume a fixed position abutting the surface of the bore, a stem mounted on the means for engaging the surface of the bore having an axis disposed parallel to the axis of the bore when the surface of the bore is engaged by said means, said stem being provided with a protruding ridge disposed normal to the axis of the stem and adapted to be slidably disposed in the linear recess of the plate, said ridge being keyed in the linear recess to maintain the axis of the stem normal to the recess, and means associated with the plate for positioning the zero angle marker in alignment with a radius of the body.

3. A device comprising the combination of claim 2 wherein the means for positioning the zero angle marker on a radius of the body comprises two feet extending from the plate toward the body on opposite sides of the axis normal to the linear scale passing through the zero angle marker, said feet being spaced from said axis by equal distances no greater than the radius of the body.

4. A device for measuring the agnle of the axis of a finger hole extending into a bowling ball from the surface thereof relative to the radius of the bowling ball at the axis of the finger hole comprising a flat plate having a linear scale thereon, said scale having a zero angle marker located centrall ytherof, said plate having a recess in surface thereof with sides parallel to the scale, peg having two spaced portions, one portion of said peg having parallel edges spaced by approximately the diameter of the finger hole and being adapted to engage the surface of the finger hole to be measured and the other portion of said peg having an outwardly extending ridge with parallel edges disposed normal to the parallel edges of the one portion, said ridge being slidably disposed within the recess of the plate, means for removably securing the ridge of the peg in the recess of the plate, and said plate having an indentation extending therein on one side of the scale, said plate having feet extending outwardly from the indented surface located at equal distances on opposite sides of the axis passing through the zero angle marker of the scale normal to the axis of the scale, the surfaces of said feet being curved about a common center with a radius of curvature approximately equal to that of a bowling ball.

5. A device comprising the elements of claim 4 wherein the means for securing the rib of the peg in the recess comprises a linear slot extending through the plate parallel to the recess and disposed centrally thereof, a pin anchored in the peg and extending through the slot, said pin being provided with threads on the end thereof remote from the peg, and a lock nut threadedly engaging the pin on the side thereof remote from the peg.

6. A device comprising the elements of claim 5 wherein the peg is provided with a depending shaft normal to the rib thereof, such shaft being threaded, and the one portion of said peg having a cylindrical stub having a channel on the axis thereof provided with threads, said stub threadedly engaging shafts.

7. A device comprising the elements of claim 4 in combination with a T-shaped member having a first leg and a second leg normal thereto, the second leg having a central linear slot, a set screw extending through the slot and anchored in the plate remote from the zero center marker of the scale, whereby, the first leg of the member may be disposed normal to the scale and utilized to mark the edge of a second hole in a bowling ball for purposes of measuring the span of the ball between the two holes thereof.

References Cited by the Examiner

UNITED STATES PATENTS

| | | | |
|---|---|---|---|
| 2,706,338 | 4/1955 | Ackerman | 33—174 |
| 2,714,256 | 8/1955 | Watson | 33—174 |
| 3,162,953 | 12/1964 | Porter | 33—174 |

LEONARD FORMAN, *Primary Examiner.*